US011898662B2

(12) United States Patent
Powell et al.

(10) Patent No.: US 11,898,662 B2
(45) Date of Patent: Feb. 13, 2024

(54) HIGH PERFORMANCE ARAMID BRAIDED HOSE (71) Applicant: Parker-Hannifin Corporation, Cleveland, OH (US)

(72) Inventors: Steven Morgan Powell, Chardon, OH (US); Ty Anthony Henry, Atwater, OH (US); Paul Howard Webster, Missouri City, TX (US); Gerald Kuzmiak, Ravenna, OH (US)

(73) Assignee: Parker-Hannifin Corporation, Cleveland, OH (US)

( * ) Notice: Subject to any disclaimer, the term of this patent is extended or adjusted under 35 U.S.C. 154(b) by 917 days.

(21) Appl. No.: 16/340,804

(22) PCT Filed: Oct. 10, 2017

(86) PCT No.: PCT/US2017/055820
§ 371 (c)(1),
(2) Date: Apr. 10, 2019

(87) PCT Pub. No.: WO2018/071352
PCT Pub. Date: Apr. 19, 2018

(65) Prior Publication Data
US 2019/0264839 A1 Aug. 29, 2019

Related U.S. Application Data (60) Provisional application No. 62/407,733, filed on Oct. 13, 2016.

(51) Int. Cl.
F16L 11/08 (2006.01)
F16L 33/207 (2006.01)
F16L 33/24 (2006.01)

(52) U.S. Cl.
CPC .......... *F16L 11/086* (2013.01); *F16L 11/087* (2013.01); *F16L 33/2076* (2013.01); *F16L 33/24* (2013.01)

(58) Field of Classification Search
CPC ...... F16L 11/086; F16L 11/087; F16L 11/081; F16L 11/085; F16L 11/088; F16L 33/01; F16L 33/24; F16L 33/2076; F16L 11/082
(Continued)

(56) References Cited

U.S. PATENT DOCUMENTS 3,990,728 A 11/1976 Coughlin
4,175,992 A * 11/1979 Grawey ................ F16L 11/088
(Continued)

FOREIGN PATENT DOCUMENTS

DE 3045533 A1 6/1982
FR 1372480 A 9/1964
GB 2088001 A 6/1982

OTHER PUBLICATIONS

International Search Report and Written Opinion of PCT/US2017/055820 dated Mar. 16, 2018.

*Primary Examiner* — William S. Choi
(74) *Attorney, Agent, or Firm* — Renner, Otto, Boisselle & Sklar, LLP (57) ABSTRACT A hose assembly includes an inner hose component, a first braid of reinforcement fiber material that extends around the inner hose component, and a second braid of reinforcement fiber material that extends around the first braid. The first braid and the second braid each has a 3 over 3 braid design, and the first braid has a first modulus and the second braid has a second modulus different from the first modulus. The first braid may be a high strength braid having a strength greater than a strength of the second braid, and the second braid may be a high modulus braid having a modulus greater than a modulus of the first braid. The hose assembly
(Continued)

optionally may have a third braid with a high angle configuration of the braid segments. The hose assembly may be combined with an enhanced fitting for securing the hose assembly to fluid system equipment.

12 Claims, 3 Drawing Sheets

(58) Field of Classification Search
USPC ........ 285/382.7, 222.3, 222.4; 138/123, 124, 138/130
See application file for complete search history.

(56) References Cited

U.S. PATENT DOCUMENTS

| | | | |
|---|---|---|---|
| 4,273,160 A * | 6/1981 | Lowles | F16L 11/088 |
| | | | 138/124 |
| 4,343,333 A * | 8/1982 | Keister | F16L 11/086 |
| 6,112,771 A * | 9/2000 | Aoyagi | F16L 11/087 |
| 7,017,432 B2 | 3/2006 | Silverman et al. | |
| 7,493,918 B2 | 2/2009 | Thomson | |
| 7,614,428 B2 | 11/2009 | Henry et al. | |
| 8,079,619 B2 | 12/2011 | Witz et al. | |
| 8,153,218 B2 * | 4/2012 | Henry | F16L 11/086 |
| 8,539,985 B2 * | 9/2013 | Weil | |
| 8,708,606 B2 | 4/2014 | Witz | |
| 9,188,258 B2 * | 11/2015 | Lamontia | F16L 11/082 |
| 2005/0121095 A1 * | 6/2005 | Ono | F16L 11/086 |
| 2005/0241716 A1 * | 11/2005 | Nagy | 138/123 |
| 2009/0211660 A1 * | 8/2009 | Johnson | F16L 11/082 |
| 2011/0036442 A1 | 2/2011 | Hahn et al. | |
| 2013/0000767 A1 * | 1/2013 | Nonaka | F16L 11/086 |
| 2013/0061974 A1 | 3/2013 | Oyaizu et al. | |
| 2014/0202574 A1 | 7/2014 | Thomson | |
| 2014/0326355 A1 | 11/2014 | Nonaka et al. | |
| 2015/0090358 A1 * | 4/2015 | Lamontia | F16L 11/087 |

* cited by examiner

HIGH PERFORMANCE ARAMID BRAIDED HOSE

RELATED APPLICATIONS

This application is a national stage application pursuant to 35 U.S.C. § 371 of PCT/US2017/055820 filed on Oct. 10, 2017, which claims the benefit of U.S. Provisional Application No. 62/407,733 filed Oct. 13, 2016, the contents of which are incorporated herein by reference.

FIELD OF INVENTION

The present invention relates generally to hose configurations suitable for use in environments in which hoses may be subject to high pressures, such as for example in deep subsea applications or comparable.

BACKGROUND OF THE INVENTION

Hydraulic and other hoses may be subjected to substantial pressures in certain environments of use. In one particular exemplary application, hydraulic and other hoses may be employed in deep undersea oil and gas drilling operations, including in blow-off preventers that act as a safety feature that closes off a drilling operation in case of a catastrophic failure. Other undersea hose applications may include hydraulic hoses, flying leads, hotline hoses, and hoses used with subsea umbilicals.

Hoses in undersea oil and gas drilling operations may experience enormous high external pressures, sometimes at 5000 psi and above, and often at pressures of 8000-9000 psi. At such pressures, there is a danger of hose failure if the hose is not designed to accommodate such pressure levels. Accordingly, hoses need to be collapse resistant when subjected to such pressures, and also must be highly impulse fatigue resistant to accommodate the impulse pressures of the fluids being transported through the hoses with high flow rates.

SUMMARY OF THE INVENTION

The present invention is an enhanced hose assembly configuration that provides a higher performance hose product as compared to conventional configurations, while still using readily available materials and manufacturing technology. In this manner, a hose assembly is configured to be both sufficiently collapse resistant and impulse pressure resistant for use particularly in undersea applications and other applications in which hose assemblies may be subjected to high pressures and flow rates. Generally, a high pressure hose assembly with maximized impulse life is achieved by a hose assembly design that minimizes stress on the hose reinforcement fiber layers, which can then be used in combination with a fitting that minimizes disruption and stresses at the attachment point of the hose assembly and fitting. The hose assembly configuration of the present invention thus may work together with a suitable fitting to enhance both burst pressure resistance and impulse life of the hose assembly.

In exemplary embodiments, the hose assembly may include a "3 over 3" braid design of reinforcement fibers fixed to an outer surface of an inner hose component. Recent advancements in braider machine designs have yielded the capability to form an effective 3 over 3 braid design versus a traditional 2 over 2 braid design that is typical of conventional configurations. The enhanced 3 over 3 braid design reduces the number of fiber cross-over points, and increases the aspect ratio (wavelength over amplitude in the braid) of cross overs substantially over conventional configurations. This enhanced aspect ratio reduces fiber stress and yields increased burst of about 3-7%.

The hose assembly further may include a two-braid design in which the two layers of 3 over 3 braiding are provided, with each braid layer having a different modulus. In exemplary embodiments, the two braid layers may include in combination a high strength first braid (inner most braid layer) and a high modulus second braid outward relative to the high strength first braid. To increase burst strength resistance and impulse life, the braids are configured with each braid layer having a different modulus so as to work in tandem to optimize load sharing across the hose assembly. This is accomplished by utilizing aramid fibers optimized for high strength on the high strength first braid. Such aramid fibers have a maximum break strength and also have relative high stretch (e.g., "elongation at break", EOB=3.3%) as compared to the high modulus second braid. This higher stretch characteristic of the high strength first braid allows the first braid to better engage the high modulus second braid. The high modulus second braid utilizes a high modulus fiber selected so that the braid will absorb and take up a greater level of stress and better support the first braid. The high modulus fiber does not stretch much at break (e.g., EOB=2.5%). This difference in stretch allows the braids to work in tandem to better share impulse load and achieve longer impulse life at higher pressures.

The hose assembly described above may be combined with an enhanced fitting for connecting the hose assembly to suitable fluid system equipment. As referenced above, the hose assembly configuration of the present invention may work together with the fitting to enhance both burst pressure resistance and impulse life of the hose assembly while providing an effective connection to fluid system equipment in environments of high pressures and flow rates, such as for example may be experienced in undersea drilling operations.

In exemplary embodiments, the hose assembly optionally may include an additional high angle third braid located in the assembly outwardly relative to the second braid. In particular, the high angle third braid may be applied with the braid segments being oriented at an angle of at least 55 degrees relative to a neutral line or longitudinal axis of the hose assembly. The high angle third braid may minimally add to impulse life, and has a principal purpose of providing increased burst pressure support when the first and second braids are highly loaded. The high angle nature of the third braid enhances the burst pressure resistance, and a high modulus fiber also may be used for the third braid to maximize loading capacity, with for example an EOB comparable to the second braid or about 2.5%.

An aspect of the invention, therefore, is a hose assembly. In exemplary embodiments, the hose assembly may include an inner hose component, a first braid of reinforcement fiber material that extends around the inner hose component, and a second braid of reinforcement fiber material that extends around the first braid. The first braid and the second braid each has a 3 over 3 braid design, and the first braid has a first modulus and the second braid has a second modulus that is different from the first modulus. The first braid may be a high strength braid having a strength greater than a strength of the second braid, and the second braid may be a high modulus braid having a modulus greater than a modulus of the first braid. The hose assembly optionally may have a third braid with a high angle configuration of the braid segments. The braid layers may be made of an aramid or para-aramid fiber material. The hose assembly may be combined with an enhanced fitting for securing the hose assembly to fluid system equipment.

These and further features of the present invention will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the spirit and terms of the claims appended hereto. Features that are described and/or illustrated with respect to one embodiment may be used in the same way or in a similar way in one or more other embodiments and/or in combination with or instead of the features of the other embodiments.

DETAILED DESCRIPTION

Embodiments of the present invention will now be described with reference to the drawings, wherein like reference numerals are used to refer to like elements throughout. It will be understood that the figures are not necessarily to scale.

The present invention is a hose assembly that has enhanced burst pressure resistance and impulse life for high pressure applications, such as undersea oil and gas drilling applications, as compared to conventional configurations. Generally, in exemplary embodiments, the hose assembly may include an inner hose component, a first braid of reinforcement fiber material that extends around the inner hose component, and a second braid of reinforcement fiber material that extends around the first braid. The first braid and the second braid each may have a 3 over 3 braid design, and the first braid may have a first modulus and the second braid may have a second modulus that is different from the first modulus.

Figure 1:
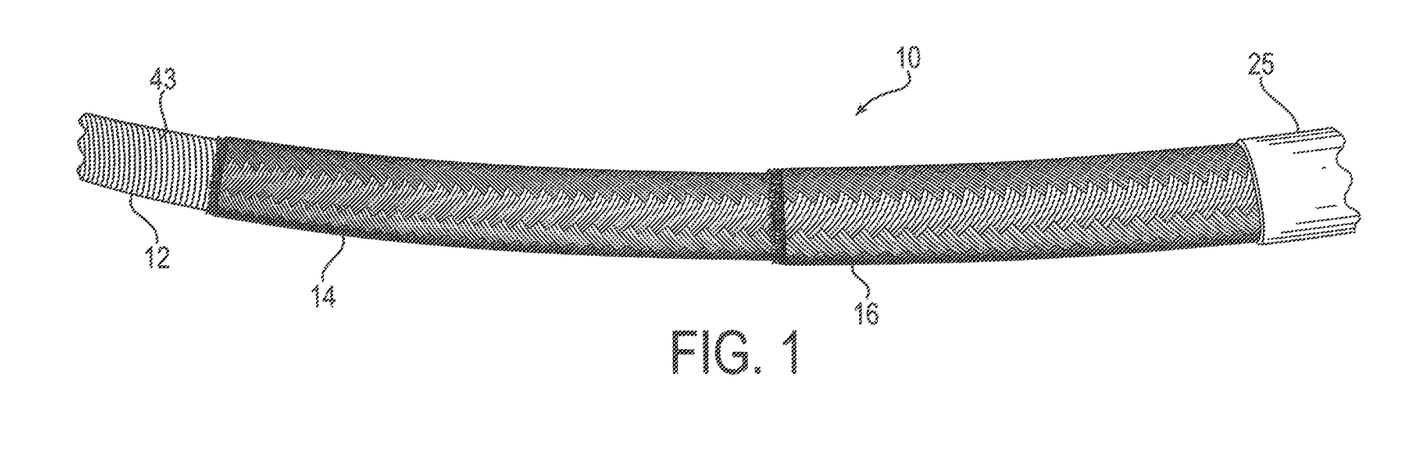
FIG. 1 is a drawing depicting a perspective view of an exemplary hose assembly with two braid layers in accordance with embodiments of the present invention.

FIG. 1 is a drawing depicting a perspective view of an exemplary hose assembly 10 in accordance with embodiments of the present invention. As shown in the example of FIG. 1, the hose assembly may include an inner hose component 12, a first or inner braid 14 of reinforcement fiber, and a second braid 16 of reinforcement fiber that is located outwardly in the hose assembly relative to the first braid 14. "Inner" versus "outer" in this context refers to the positioning of pertinent components relative to the space defined by the hose component in which the fluid flows, with the inner hose component being the innermost component. Accordingly, the first braid 14 extends around the inner hose component 12, and the second braid 16 extends around the first braid 14.

It will be appreciated that the specific inner hose component depicted in FIG. 1 is a non-limiting example. The term "hose" or "hose component" may refer to any generally tubular, elongated member or device and includes flexible, semi-flexible and rigid devices commonly referred to as "hoses," "tubes," "pipes" and the like. Hoses may have different cross-sections, and may have for example, round, oval, polygonal or other cross sectional shapes. Hoses may be of any material, including, for example, thermosetting, thermoplastic, metallic and non-metallic materials. Hoses may be single wall, multiple wall, reinforced or non-reinforced, and may include end fittings or no end fittings. In undersea hydraulic applications, common hose materials may include various rigid or semi-rigid materials that resist corrosion and have the strength capacity for the high pressures and flow rates associated with undersea applications. Example hose materials may include various polyamide materials with ranging amounts of plasticizers as are known in the art.

Figure 2:
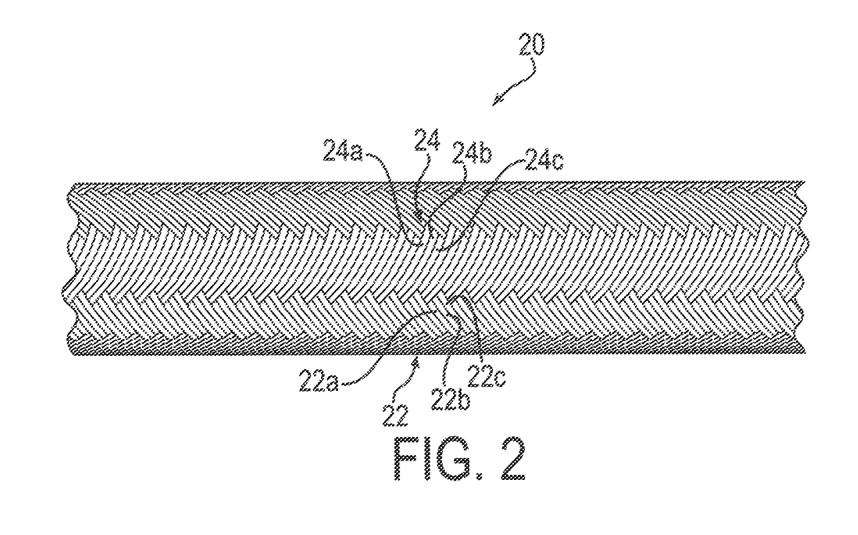
FIG. 2 is a drawing depicting an exemplary 3 over 3 braid configuration.

In exemplary embodiments, the first braid 14 and the second braid 16 may have a "3 over 3" braid design of reinforcement fiber, with the first braid 14 covering an outer surface of and extending around the inner hose component 12, and the second braid 16 covering an outer surface of and extending around the first braid 14. As referenced above, recent advancements in braider machine designs have yielded the capability to form an effective a 3 over 3 braid design versus a traditional 2 over 2 braid design that is typical of conventional configurations. FIG. 2 is a drawing depicting an exemplary 3 over 3 braid configuration 20 that generally may be employed in the first and second braids of the present invention. The term "3 over 3" refers to the pattern of weave of the fiber bundles that form the braid. Referring to FIG. 2, a first fiber bundle 22 may include three adjacent fiber strands 22a, 22b, and 22c. Similarly, a second fiber bundle 24 also may include three adjacent fiber strands 24a, 24b, and 24c. The three-fibered fibers bundles 22 and 24 are then weaved together in a patterned braid fashion to form the 3 over 3 braid configuration shown in FIG. 2.

As defined in the context of the current invention, an "aspect ratio" is a term that denotes a ratio of the wavelength (undulation length) of braid segments relative to the amplitude of the braid segments. As used in connection with braided designs, the "wavelength" is defined as a distance along the braid path of one complete undulation, which equals the helix length of one carrier for one complete pitch over the complete undulations per helix length in one pitch. The "amplitude" is defined as the maximum radial difference of reinforcement for the undulation pattern, which equals the outermost braid radius minus the inner most braid radius.

As a typical numerical example, for a 24 carrier braider with helix length of 36 mm and a 3 over 3 braid pattern, the wavelength equals 36/4=9. A typical example for amplitude is an innermost braided layer with braid outside diameter of 18 mm and inner tube outside diameter of 12 mm. Amplitude for such example is calculated as (18/2)−(12/2)=9−6=3. The aspect ratio for the 3 over 3 braid pattern is then the ratio of wavelength/amplitude=9/3=3. By comparison, the wavelength, and thus the resultant aspect ratio, differs in a conventional 2 over 2 braid design. In a comparable numerical example for the same 24 carrier braider with helix length of 36 mm, the wavelength for a 2 over 2 braid pattern=36/6=6. With the amplitude calculation yielding a comparable result of 3, the aspect ratio for the 2 over 2 braid pattern is wavelength/amplitude=6/3=2. As shown by this example, therefore, the aspect ratio for the 3 over 3 braid design is 50% more than that of a 2 over 2 braid design generated under comparable circumstances.

For reinforcement applications, a larger aspect ratio is advantageous for reducing cross over points where stress accumulates, which must be balanced against the need for sufficient braid material for adequate reinforcement insofar as a higher aspect ratio generally may be achieved by reducing the braid thickness (i.e., a thinner braid may have a higher aspect ratio). The enhanced 3 over 3 braid design of the present invention reduces the number of fiber cross-over points, or in other words increases the aspect ratio of cross overs, substantially as compared to conventional 2 over 2 braid configurations as demonstrated by the above calculations. In measuring hose assembly performance, burst pressure refers to the maximum pressure achievable without hose assembly failure, and impulse life refers to cyclic pressure fatigue under the conditions of exposure. The referenced aspect ratio enhancement reduces fibers stress and yields increased burst pressure resistance of about 3-7% over exemplary configurations. In exemplary embodiments, the aspect ratio achieved by the 3 over 3 braid configuration of the present invention may be at least six, and preferably within a range of about 6.6 to 7.5, which is suitable for hose reinforcement in undersea drilling operations and other high pressure applications.

Referring again to FIG. 1, in exemplary embodiments each of the first braid 14 and second braid 16 individually may have the 3 over 3 braid configuration, and the two braids are layered on the inner hose component 12. The braids may be made of an aramid (aromatic polyamide) fiber material, and a para-aramid fiber material in a preferred embodiment. Aramid and para-aramid materials generally are corrosion resistant and high strength synthetic fiber materials. Examples of suitable aramid or para-aramid materials include Kevlar and Twaron.

In exemplary embodiments, the first braid may have a first modulus and the second braid may have a second modulus that is different from the first modulus. The two braid layers may include in combination a high strength first inner braid 14 and a high modulus second braid 16 outward relative to the high strength first braid. In other words, the first braid 14 can be referred to as a high strength braid having a strength greater than a strength of the second braid 16. In addition, the second braid 16 may be referred to as a high modulus braid having a modulus greater than a modulus of the first braid 14.

In this manner, the second braid 16 may permit overall elongation to increase efficiency by having a higher modulus relative to the first braid 14. To increase burst pressure resistance and impulse life, the braids are configured with such different modulus to work in tandem to optimize load sharing across the hose assembly 10. This is accomplished by utilizing the referenced aramid or para-aramid fibers optimized for high strength on the high strength first braid. Such aramid fibers have a maximum break strength and also has relative high stretch (e.g., EOB=3.3%) as compared to the high modulus second braid. This higher stretch characteristic of the high strength first braid allows the first braid to better engage the high modulus second braid. The high modulus second braid utilizes a high modulus fiber that also may be aramid or para-aramid, otherwise selected so that the braid will absorb and take up a greater level of stress and better support the first braid. The high modulus fiber does not stretch much at break (e.g., EOB=2.5%). This difference in stretch allows the braids to work in tandem to better share impulse load and achieve longer impulse life at higher pressures.

Configured as above, with high aspect ratio aramid or para-aramid braids, test pressures of about 26,000-31,000 psi have been achieved using a single braid layer. With the addition of the second braid layer, test pressures up to about 45,000 psi have been achieved. The braid layers may be modified relative to each other to enhance or optimize performance for particular conditions. For example, the second braid layer 16 may be thinner than the first braid layer 14 so that second braid layer can have a greater aspect ratio than the aspect ratio of the first braid layer. In exemplary embodiments, as referenced above the aspect ratio may be 6.6 to 7.5, and the higher aspect ratio of the second braid layer may be in the range of approximately 12 to 15. More generally, the aspect ratio of the second braid may be at least 30% higher than the aspect ratio of the first braid. Having a thinner, higher aspect ratio second braid layer improves engagement of the two braid layers, which enhances the overall modulus of the assembly.

The hose assembly 10 further may include an outer sheath layer 25 that extends around the second braid 16. The outer sheath layer may be made of any suitable elastomeric material, which may be reinforced, that acts as an outer protective covering for the hose assembly 10.

The embodiment of FIG. 1 employs a design with two braid layers. In certain applications, a layered design of three braids may be utilized for enhanced reinforcement. The benefit of the third braid for enhanced reinforcement generally may be balanced against negatives of adding the third braid. A third braid may add cost, weight, and unwanted stiffness to the hose assembly. In the configuration of the present invention, therefore, the third braid layer often may not be present, but constitutes an option for applications in which even more enhanced reinforcement is desirable.

Figure 3:
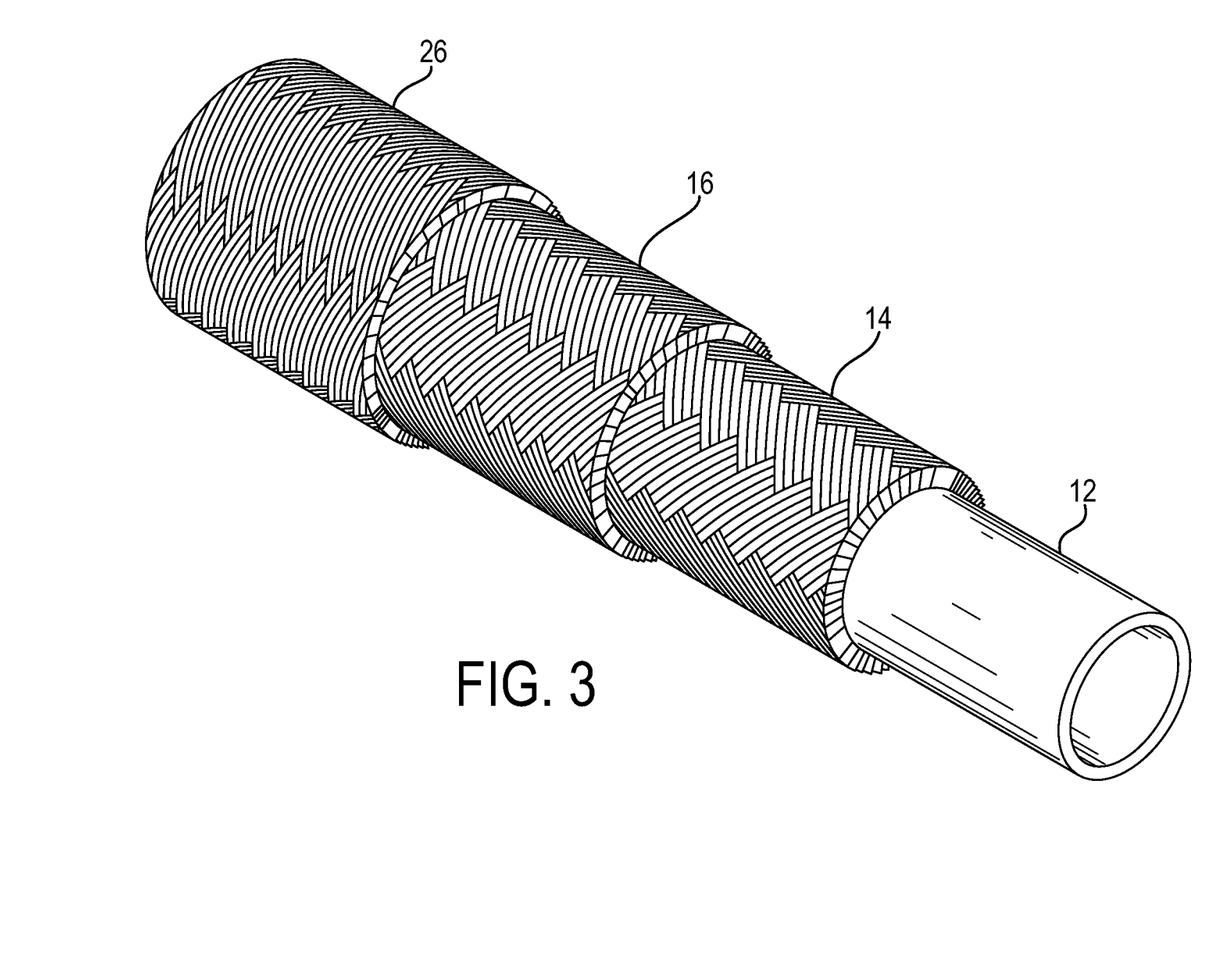
FIG. 3 is a drawing depicting a perspective view of an exemplary hose assembly with three braid layers in accordance with embodiments of the present invention.

In applications where benefits of a third braid outweigh the drawbacks, a third braid layer may be added to the outer surface of the second braid layer 16, and the sheath 25 then covers the third braid layer. FIG. 3 is a drawing depicting a perspective view of the exemplary hose assembly 10 modified to have three braid layers in accordance with embodiments of the present invention, with the outer sheath 25 removed for convenient illustration.

In particular, FIG. 3 shows a third braid layer 26 is added to the outer surface of the second braid layer 16, and thus the third braid extends around the second braid. The third braid layer 26 also is therefore located in the hose assembly 10 between the second braid layer 16 and the outer sheath, and thus the outer sheath extends around the third braid in a three-braid embodiment. The third braid 26 may have properties in common with the first braid 14 and the second braid 16. For example, the third braid also may have a 3 over 3 braid design, and/or may be made of an aramid or para-aramid fiber material such as Kevlar or Twaron.

In exemplary embodiments, the third braid layer 26 may be a high angle braid. In the braiding art particularly as associated with hose assembly reinforcement braids, those of ordinary skill in art define a "high angle braid" as a braid in which the braid segments are oriented at an angle of at least 54.7 degrees relative to a neutral line corresponding to a longitudinal axis of the hose assembly in a direction of fluid flow. In embodiments of the present invention, the high angle third braid segments may be applied at an angle of at least 55 degrees, and preferably 57 to 60 degrees, relative to the neutral line or longitudinal axis of the hose assembly. The high angle third braid may minimally add to impulse life, and has a principal purpose of providing increased burst pressure support when the first and second braids are highly loaded. The high angle nature of the third braid thus enhances the overall burst pressure resistance of the assembly, and a high modulus aramid or para-aramid fiber also may be used for the third braid to maximize loading capacity, with for example an EOB comparable to the second braid or about 2.5%.

The hose assembly described above may be combined with an enhanced hose assembly fitting for connecting the hose assembly to suitable fluid system equipment. As referenced above, the hose assembly configuration of the present invention may work together with the fitting to enhance both burst pressure resistance and impulse life of the hose assembly, while maintaining effective engagement with fluid system equipment under high pressures and flow rates. Generally, embodiments of a hose assembly fitting may include an outer shell that is connected to a nipple that is located radially inward relative to the outer shell. The outer shell and the nipple define a groove spacing for receiving the hose assembly, and the outer shell may be crimped toward the nipple to secure the hose assembly within the groove spacing. An inner surface of the outer shell may include blunt groove features that define the groove spacing, and a hose receiving end of the nipple may be a threaded end including a plurality of threads.

Figure 4:
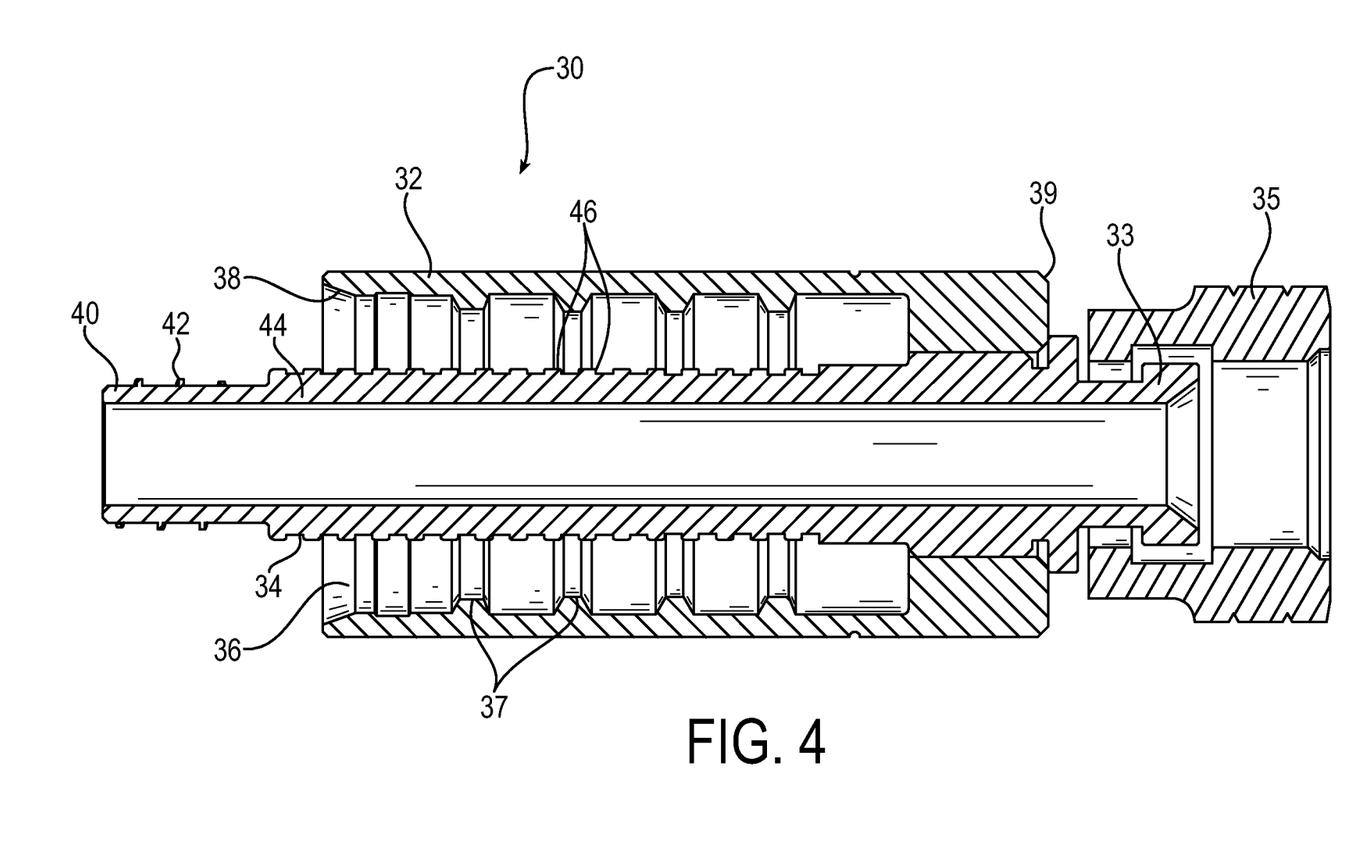
FIG. 4 is a schematic diagram depicting an exemplary hose fitting in accordance with embodiments of the present invention.

FIG. 4 is a schematic diagram depicting an exemplary hose fitting 30 in accordance with embodiments of the present invention. The hose fitting 30 may include an outer shell 32 that is connected to a nipple 34, the nipple 34 being located radially inward relative to the outer shell. For example, the outer shell 32 may be threaded onto the nipple 34.

The outer shell 32 and nipple 34 may define a groove spacing 36 for receiving the hose assembly 10. The relative wide groove spacing 36 permits the hose assembly to move into the grooves and not push out of the fitting, which can distort the braiding. Once the hose assembly is inserted into the groove spacing 36, the outer shell may be crimped onto the hose assembly, such as by using a hydraulic press. The shell/nipple design is optimized for 8-die crimped fittings as are known in the art. The nipple 34 further may include a first fixing end 33 that is fixed to a fluid connector 35 that may be configured as a bookend joint. The fluid connector or bookend joint 35 permits connection of the hose assembly fitting to porting on fluid system equipment.

The outer shell 32 may be made of a low yield strength stainless steel and may be annealed. This prevents spring back of the outer shell when crimped. The outer shell may include a tapered skirt 38 at an end of the outer shell opposite from an end 39 where the outer shell is threaded onto or otherwise connected to the nipple. The tapered skirt 38 particularly prevents early yarn fractures during burst and impulse testing. An inner surface of the outer shell may include blunt groove features 37 that define the groove spacing 36. The blunt nature of groove features 37 permits the outer sheath material to readily slide along the groove features without the hose assembly pushing out from the fitting. The blunt groove features 37 are less aggressive than conventional barbs, and thus have less of a tendency to cut into the outer sheath material thereby preventing water ingress into the hose assembly.

The nipple 34 may be made of a suitable high strength material as are known in the art, such as a high strength metal material. In exemplary embodiments, a yield pressure for failure of the nipple may be greater than the burst pressure of the hose assembly, and preferably approximately 120% of the burst pressure of the hose assembly. A hose receiving end 40 of the nipple may extend from a nipple body 44. The nipple body 44 may have an external grooved surface 46. The grooved surface 46 allows for improved sealing, with the inner surface of the inner hose of the hose assembly.

The hose assembly 10 and the hose assembly fitting 30 may be joined to form a hose system. To enhance the secured fit of the hose assembly and the hose assembly fitting, the hose receiving end 40 of the nipple 34 may be configured as a threaded end including a plurality of threads 42. In addition, the inner hose component 12 of the hose assembly 10 may be configured as a carcass having a plurality of pitched grooves that interact with the threads of the hose receiving end of the nipple to secure the hose assembly 10 to the hose assembly fitting 30. An example of such pitched grooves is identified as element 43 in FIG. 1.

A characteristic of the hose carcass is that when twisted clockwise (if looking at the carcass end), the carcass essentially swells and the pitch of the grooves lengthens. Conversely, if twisted in a counter-clockwise direction, the carcass necks down and the pitch of the grooves shortens. The threads 42 of the nipple of the hose assembly fitting are designed to have a longer pitch than a pitch of the pitched grooves of the inner hose component carcass. When threading the nipple into the hose assembly carcass (right-hand thread), the carcass swells and the pitch elongates allowing the nipple to be threaded into in the inner hose. Since the pitch of the nipple threads 42 is slightly longer than the carcass, there is a binding action between the carcass and nipple. When a force to unscrew the nipple is applied in a counter-clock wise direction, the carcass wants to neck down and the pitch shorten, but this cannot occur due to the threads 42, which strongly secures the nipple 34 within the hose assembly 10. In exemplary embodiments, only three threads 42 may be needed for full engagement of the nipple and hose assembly to prevent separation of the nipple and hose assembly, although different numbers of threads may be employed as appropriate for any suitable application.

An aspect of the invention, therefore, is a hose assembly having an enhanced braided layer design. In exemplary embodiments, the hose assembly may include an inner hose component, a first braid of reinforcement fiber material that extends around the inner hose component, and a second braid of reinforcement fiber material that extends around the first braid. The first braid and the second braid each has a 3 over 3 braid design, and the first braid has a first modulus and the second braid has a second modulus that is different from the first modulus. The hose assembly may include one or more of the following features, either individually or in combination.

In an exemplary embodiment of the hose assembly, an aspect ratio of the first braid and the second braid comprises a ratio of a wavelength of braid segments to an amplitude of braid segments, and the aspect ratio of the second braid is greater than the aspect ratio of the first braid.

In an exemplary embodiment of the hose assembly, an aspect ratio of the first braid and the second braid comprises a ratio of a wavelength of braid segments to an amplitude of braid segments, and the aspect ratio of the first braid and the second braid is at least six.

In an exemplary embodiment of the hose assembly, the aspect ratio of the second braid is at least 30% higher than the aspect ratio of the first braid.

In an exemplary embodiment of the hose assembly, the first braid is a high strength braid having a strength greater than a strength of the second braid.

In an exemplary embodiment of the hose assembly, the second braid is a high modulus braid having a modulus greater than a modulus of the first braid.

In an exemplary embodiment of the hose assembly, the first braid and the second braid are made of an aramid fiber material or a para-aramid fiber material.

In an exemplary embodiment of the hose assembly, the first braid and the second braid are made of para-aramid fiber.

In an exemplary embodiment of the hose assembly, the hose assembly further includes a third braid of reinforcement fiber material that extends around the second braid, wherein the third braid has a 3 over 3 braid design.

In an exemplary embodiment of the hose assembly, the third braid has a high angle configuration in which braid segments are oriented an angle of at least 55 degrees relative to a neutral line corresponding to a longitudinal axis of the hose assembly.

In an exemplary embodiment of the hose assembly, the angle of the high angle configuration is 57 to 60 degrees.

In an exemplary embodiment of the hose assembly, the third braid is made of an aramid fiber material or a para-aramid fiber material.

In an exemplary embodiment of the hose assembly, the third braid is made of a para-aramid fiber.

In an exemplary embodiment of the hose assembly, the hose assembly further includes an outer sheath that extends around the second braid.

In an exemplary embodiment of the hose assembly, the hose assembly further includes an outer sheath that extends around the third braid.

Another aspect of the invention is a hose assembly fitting for connecting a hose assembly to fluid system equipment. In exemplary embodiments, the hose assembly fitting may include an outer shell that is connected to a nipple that is located radially inward relative to the outer shell, the outer shell and the nipple defining a groove spacing for receiving the hose assembly, and the outer shell is crimped toward the nipple to secure the hose assembly within the groove spacing. An inner surface of the outer shell includes blunt groove features that define the groove spacing. A hose receiving end of the nipple is a threaded end including a plurality of threads. The hose assembly fitting may include one or more of the following features, either individually or in combination.

In an exemplary embodiment of the hose assembly fitting, the outer shell includes a tapered skirt at an end of the nipple opposite form an end where the outer shell is connected to the nipple.

In an exemplary embodiment of the hose assembly fitting, the hose assembly fitting further includes a fluid connector for connecting the hose assembly fitting to fluid system equipment, wherein the nipple includes a fixing end for fixing the nipple to the fluid connector.

Another aspect of the invention is a hose system including the hose assembly according to any of the embodiments, and the hose assembly fitting according to any of the embodiments. In exemplary embodiments, the inner hose component of the hose assembly is configured as a carcass having a plurality of pitched grooves that interact with the threads of the hose receiving end of the nipple to secure the hose assembly to the hose assembly fitting.

In an exemplary embodiment of the hose system, the threads of the hose assembly fitting have a longer pitch than a pitch of the pitched groves of the inner hose component of the hose assembly.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A hose assembly comprising:
an inner hose component;
a first braid of reinforcement fiber material that extends around the inner hose component; and
a second braid of reinforcement fiber material that extends around and contacts the first braid;
wherein the first braid and the second braid each has a 3 over 3 braid design; and
the first braid has a first modulus and the second braid has a second modulus that is different from the first modulus;
wherein an aspect ratio of the first braid and the second braid comprises a ratio of a wavelength of braid segments to an amplitude of braid segments, and the aspect ratio of the second braid is greater than the aspect ratio of the first braid.

2. The hose assembly of claim of claim 1, wherein the aspect ratio of the first braid and the second braid is at least six.

3. The hose assembly of claim 1, wherein the aspect ratio of the second braid is at least 30% higher than the aspect ratio of the first braid.

4. The hose assembly of claim 1, wherein the first braid is a high strength braid having a strength greater than a strength of the second braid.

5. The hose assembly of claim 4, wherein the second braid is a high modulus braid having a modulus greater than a modulus of the first braid.

6. The hose assembly of claim 1, wherein the first braid and the second braid are made of a para-aramid fiber material.

7. The hose assembly of claim 1, further comprising an outer sheath that extends around the second braid.

8. The hose assembly of claim 1, further comprising a third braid of reinforcement fiber material that extends around the second braid, wherein the third braid has a 3 over 3 braid design.

9. The hose assembly of claim 8, wherein the third braid has a high angle configuration in which braid segments are oriented an angle of at least 55 degrees relative to a neutral line corresponding to a longitudinal axis of the hose assembly.

10. The hose assembly of claim 9, wherein the angle of the high angle configuration is 57 to 60 degrees.

11. The hose assembly of claim 8, wherein the third braid is made of a para-aramid fiber material.

12. The hose assembly of claim 8, further comprising an outer sheath that extends around the third braid.

\* \* \* \* \*